US011577683B2

(12) United States Patent
Yamamoto et al.

(10) Patent No.: US 11,577,683 B2
(45) Date of Patent: Feb. 14, 2023

(54) GAS GENERATOR

(71) Applicant: DAICEL CORPORATION, Osaka (JP)

(72) Inventors: Koji Yamamoto, Tokyo (JP); Tomoharu Miyamoto, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 339 days.

(21) Appl. No.: 16/632,064

(22) PCT Filed: Jul. 9, 2018

(86) PCT No.: PCT/JP2018/025936
§ 371 (c)(1),
(2) Date: Jan. 17, 2020

(87) PCT Pub. No.: WO2019/017230
PCT Pub. Date: Jan. 24, 2019

(65) Prior Publication Data
US 2020/0148158 A1 May 14, 2020

(30) Foreign Application Priority Data
Jul. 21, 2017 (JP) .............................. JP2017-141981

(51) Int. Cl.
*B60R 21/264* (2006.01)
*B60R 1/26* (2022.01)
(Continued)

(52) U.S. Cl.
CPC ............ *B60R 21/264* (2013.01); *B60R 21/26* (2013.01); *B60R 21/263* (2013.01); *B60R 2021/26029* (2013.01)

(58) Field of Classification Search
CPC .............. B60R 21/264; B60R 21/2644; B60R 2021/2642
See application file for complete search history.

(56) References Cited

U.S. PATENT DOCUMENTS 4,722,551 A * 2/1988 Adams ................ B60R 21/2644
280/736
5,466,420 A * 11/1995 Parker .................... B01D 46/24
422/165
(Continued)

FOREIGN PATENT DOCUMENTS

CN 101746344 A 6/2010
DE 197 16 652 A1 10/1998
(Continued)

OTHER PUBLICATIONS

International Preliminary Report on Patentability and Written Opinion, dated Jan. 30, 2020, for International Application No. PCT/JP2018/025936, with an English Translation.
(Continued)

*Primary Examiner* — Barry Gooden, Jr.
(74) *Attorney, Agent, or Firm* — Birch, Stewart, Kolasch & Birch, LLP

(57) ABSTRACT

A gas generator, includes an igniter, a housing provided with a gas discharge port, and including a combustion chamber to burn a gas generating agent, the igniter being shifted from a center of a cluster of the gas generating agent, an isolating part surrounding at least a portion of the cluster of the gas generating agent, and forms, between the isolating part and a predetermined area, a gas flow space serving and a plurality of communicating parts that are provided in the isolating part and connect the combustion chamber and the gas flow space, a portion of the plurality of communicating parts allowing a combustion product generated by combustion of the gas generating agent disposed proximal to the igniter to flow into the gas flow space, and another portion of the plurality of communicating parts allowing a combustion product flowing through the gas flow space to flow out toward the gas generating agent disposed distal to the igniter.

17 Claims, 12 Drawing Sheets

(51) Int. Cl.
*B60R 21/26* (2011.01)
*B60R 21/263* (2011.01)

(56) References Cited

U.S. PATENT DOCUMENTS

| | | | |
|---|---|---|---|
| 6,364,354 | B1 | 4/2002 | Nakashima et al. |
| 6,412,815 | B1 | 7/2002 | Nakashima et al. |
| 6,460,884 | B1 | 10/2002 | Nakashima et al. |
| 6,491,320 | B1 | 12/2002 | Nakashima et al. |
| 6,491,321 | B1 | 12/2002 | Nakashima et al. |
| 6,557,888 | B1 | 5/2003 | Nakashima et al. |
| 6,669,230 | B1 | 12/2003 | Nakashima et al. |
| 6,722,694 | B1 | 4/2004 | Nakashima et al. |
| 8,740,245 | B2 * | 6/2014 | Fukawatase ............ B60R 21/26 280/736 |
| 11,173,868 | B2 * | 11/2021 | Yamamoto ................. B01J 7/00 |
| 11,221,197 | B2 * | 1/2022 | Yamamoto ................. B01J 7/00 |
| 11,230,254 | B2 * | 1/2022 | Yamamoto ............ B60R 21/263 |
| 2002/0056976 | A1 | 5/2002 | Nakashima et al. |
| 2002/0063420 | A1 | 5/2002 | Nakashima et al. |
| 2002/0167155 | A1 | 11/2002 | Nakashima et al. |
| 2002/0175509 | A1 * | 11/2002 | Iwai .................... B60R 21/2644 280/741 |
| 2003/0010247 | A1 * | 1/2003 | Miyaji .................. B60R 21/261 280/728.1 |
| 2003/0127840 | A1 * | 7/2003 | Nakashima ......... B60R 21/2644 280/741 |
| 2004/0061319 | A1 | 4/2004 | Saso et al. |
| 2004/0244632 | A1 | 12/2004 | Matsuda |
| 2004/0262900 | A1 | 12/2004 | Yoshida et al. |
| 2005/0184498 | A1 * | 8/2005 | Trevillyan .......... B60R 21/2644 280/741 |
| 2007/0001437 | A1 | 1/2007 | Wall et al. |
| 2009/0108572 | A1 * | 4/2009 | Smith .................. B60R 21/2644 280/736 |
| 2012/0086191 | A1 * | 4/2012 | Parkinson ........... B60R 21/2644 280/741 |
| 2014/0054881 | A1 * | 2/2014 | Fukawatase ............. C06D 5/00 280/741 |
| 2018/0154859 | A1 | 6/2018 | Kubo et al. |
| 2019/0322239 | A1 * | 10/2019 | Norman, III ........ B60R 21/2644 |

FOREIGN PATENT DOCUMENTS

| | | | | |
|---|---|---|---|---|
| EP | 0 787 630 A1 | 8/1997 | | |
| JP | 7-215171 A | 8/1995 | | |
| JP | 9-183359 A | 7/1997 | | |
| JP | 2002-127864 A | 5/2002 | | |
| JP | 2004-359031 A | 12/2004 | | |
| JP | 2007-197006 A | 8/2007 | | |
| JP | 2019206331 A | * 12/2019 | ............... | B01J 7/00 |
| JP | 2021062814 A | * 4/2021 | | |
| WO | WO-2015198802 A1 | * 12/2015 | ................. | B01J 7/00 |
| WO | WO-2019111566 A1 | * 6/2019 | ........... | B60R 21/263 |
| WO | WO-2021009948 A1 | * 1/2021 | | |
| WO | WO-2021029257 A1 | * 2/2021 | | |

OTHER PUBLICATIONS

International Search Report, dated Aug. 21, 2018, for International Application No. PCT/JP2018/025936, with an English Translation.

* cited by examiner

GAS GENERATOR

FIELD

The present invention relates to a gas generator configured to burn a gas generating agent by actuation of an igniter, thereby generating combustion gas.

BACKGROUND

In a gas generator configured to burn a gas generating agent, which is filled in a combustion chamber, by actuation of an igniter to generate combustion gas, unless the gas generating agent that is filled burns as desired, it is difficult to generate combustion gas as designed. In general, to make the gas generating agent burn without unevenness and generate combustion gas as designed, the gas generating agent is uniformly disposed around the igniter. However, the configuration of the gas generator may make it difficult to uniformly dispose the gas generating agent around the igniter. For example, in the gas generator described in Patent Document 1, as illustrated in FIGS. 3A and 3B and 4, an igniter is provided at a position biased with respect to a central axis of the gas generator, and the gas generating agent is filled on a side of the gas generator opposite to the side on which the igniter is provided. In such a configuration, the combustion of the gas generating agent is attempted by aligning the orientation of a flame transfer hole provided in the housing of the igniter with the side filled with the gas generating agent.

In addition, Patent Document 2 discloses a gas generator in which a combustion chamber is formed in a region including a center of a round shell container, and a plurality of accommodating containers accommodating an ignition and fuel unit including an igniter and a gas generating agent are disposed inside the combustion chamber. In this gas generator, each gas generating agent contained in the plurality of accommodating containers is independently combusted by a corresponding igniter. In such a gas generator, while each igniter is provided in a position shifted with respect to the central axis of the outer shell container, in each accommodating container, the gas generating agent is disposed substantially uniformly around the periphery of the igniter. Note that in the gas generator described above, a filter chamber having an annular shape is formed around the combustion chamber, an outlet opening is formed in an outer wall constituting the filter chamber, and the gas in the filter chamber is released from the outlet opening to outside the gas generator.

CITATION LIST

Patent Document

[Patent Document 1] US 2007/0,001,437 A
[Patent Document 2] JP H09-183359 A

SUMMARY

Technical Problem

In a case that a gas generating agent with which a combustion chamber is filled is burned by actuation of an igniter in a gas generator, preferably the gas generating agent is disposed uniformly around the igniter to achieve combustion of the gas generating agent without unevenness. However, depending on the structure of the gas generator, it may be difficult to thus dispose the igniter in a position suitable for uniform combustion relative to the gas generating agent. For example, the igniter may need to be disposed at a position shifted from the gas generating agent due to restrictions on the shape or dimensions of the gas generator.

The configuration employed with the gas generator described above is a configuration in which the orientation of the flame transfer hole provided in the housing of the igniter is aligned with gas generating agent, leaving room for improvement in achieving uniform combustion of the gas generating agent in a case that the arrangement of the igniter is shifted from a position suitable for uniform combustion of the gas generating agent.

In light of the problems described above, an object of the present invention is to provide a technique that makes it possible to achieve uniform combustion of a gas generating agent regardless of an arrangement of an igniter in a gas generator.

Solution to Problem

In order to solve the problems described above, according to the present invention, a combustion chamber filled with a gas generating agent and a gas flow space not filled with a gas generating agent are formed inside a housing of a gas generator. Then, the gas generator is configured such that a combustion product generated by combustion of the gas generating agent disposed proximal to the igniter is flowed into the gas flow space by a portion of a plurality of communicating parts that connect the combustion chamber and the gas flow space, and the combustion product flowing through the gas flow space is flowed out toward the gas generating agent disposed distal to an igniter by another portion of the plurality of communicating parts. This configuration makes it possible to achieve uniform combustion of the gas generating agent regardless of the arrangement of the igniter in the gas generator.

Specifically, according to the present invention, a gas generator includes an igniter, and a housing accommodating the igniter, provided with a gas discharge port, and including a combustion chamber configured to burn a gas generating agent filled in a position to be combustible by actuation of the igniter, the igniter being disposed in a position relative to the gas generating agent filled in the combustion chamber that is shifted from a center of a cluster of the gas generating agent. The gas generator further includes an isolating part that surrounds at least a portion of the cluster of the gas generating agent, and forms, between the isolating part and a predetermined area where the gas discharge port is not formed, a gas flow space serving as a space in the housing where the gas generation agent is not filled, and a plurality of communicating parts that are provided in the isolating part and connect the combustion chamber and the gas flow space. Further, a portion of the plurality of communicating parts is configured to allow a combustion product generated by combustion of the gas generating agent disposed proximal to the igniter to flow into the gas flow space, and another portion of the plurality of communicating parts are configured to allow a combustion product flowing through the gas flow space to flow out toward the gas generating agent disposed distal to the igniter.

In such a gas generator, when the igniter is actuated, first, the gas generating agent disposed proximal to the igniter burns. In doing so, a combustion product is generated proximal to the igniter inside the combustion chamber. Further, the combustion product generated proximal to the igniter is subsequently spread not only throughout the combustion chamber, but also throughout the gas flow space via the portion of the plurality of communicating parts. Here, as described above, the gas flow space is not filled with the gas generating agent. Therefore, the gas flow space is considered to be in a state where the combustion product readily diffuses compared to the combustion chamber filled with the gas generating agent. Accordingly, the combustion product generated proximal to the igniter can diffuse more rapidly from the igniter when flowing through the gas flow space than when flowing through the combustion chamber. That is, the combustion product generated proximal to the igniter flows into the gas flow space from the portion of the plurality of communicating parts, flows through the gas flow space, and subsequently flows out from the another portion of the plurality of communicating parts and into the combustion chamber, and thus can reach the gas generating agent disposed distal to the igniter as rapidly as possible. As a result, not only the gas generating agent disposed proximal to the igniter, but also the gas generating agent disposed distal to the igniter are burned in a relatively short period of time.

Note that the isolating part provided in the gas generator described above forms the gas flow space between the isolating part and the predetermined area in the housing where the gas discharge port is not formed. That is, the gas flow space is a space connected to the combustion chamber with the plurality of communicating parts interposed therebetween, and is not directly connected to the gas discharge port formed in the housing. Accordingly, the combustion product flowing through the gas flow space flows further through the combustion chamber, and is ultimately discharged from the gas discharge port. Thus, the combustion product flowing through the gas flow space is efficiently guided to the gas generating agent disposed distal to the igniter.

With the configuration described above, even when the relative position of the igniter with respect to the gas generating agent is shifted from the center of the cluster of the gas generating agent, the gas generating agent disposed distal to the igniter can be burned in a relatively short period of time. That is, uniform combustion of the gas generating agent can be achieved regardless of the arrangement of the igniter in the housing. As a result, a favorable combustion gas generating capacity can be exhibited.

Herein, in the gas generator described above, the another portion of the plurality of communicating parts may be formed with opening areas increasing in size as a distal position from the igniter increases in distance. In this case, the another portion of the plurality of communicating parts are configured to allow the combustion product to more readily enter the combustion chamber as the distal position of the another portion of the plurality of communicating parts increases in distance from the igniter. As a result, with the combustion product flowing out from the gas flow space toward the gas generating agent via the another portion of the plurality of communicating parts, the gas generating agent, even when disposed distally from the igniter, can be readily burned in a favorable manner. Thus, a more uniform combustion of the gas generating agent in the gas generator can be achieved.

Furthermore, in the gas generator described above, the housing may be formed by joining at least two members, two of the at least two members being integrated by welding at a predetermined welded part, and the predetermined welded part being separated from the combustion chamber by the gas flow space. According to such a configuration, a situation in which the heat of welding applied to the predetermined welded part when the housing is integrated is moving into the interior of the housing is alleviated by the gas flow space. That is, the heat transfer of the welding heat to the combustion chamber inside the housing is suppressed by the gas flow space. This makes it possible to prevent the gas generating agent filled in the combustion chamber from being unintentionally burned by the welding heat. Furthermore, in such a gas generator, not only can uniform combustion of the gas generating agent be improved as described above, but also the safety when assembling the gas generator is favorably secured.

The gas generator described above may be configured to further include a dividing wall that vertically divides the combustion chamber and forms a first combustion chamber positioned on an upper side thereof and the combustion chamber positioned on a lower side thereof in an interior of the housing, and a first igniter that burns a first gas generating agent filled in the first combustion chamber, and the igniter that burns the gas generating agent filled in the combustion chamber, disposed on a bottom surface of the housing. In such a configuration, the gas discharge port may be formed in the housing on the first combustion chamber side, the dividing wall may include an accommodating wall surrounding the first igniter disposed on the bottom surface and accommodating the first igniter inside the first combustion chamber, the isolating part may be disposed in the combustion chamber and surround at least a portion of a cluster of the gas generating agent, forming the gas flow space between the isolating part and an inner wall surface of the housing on the combustion chamber side, the portion of the plurality of communicating parts may be configured to allow a combustion product generated by combustion of the gas generating agent disposed proximal to the igniter to flow into the gas flow space, and the another portion of the plurality of communicating parts may be configured to allow a combustion product flowing through the gas flow space to flow out toward the gas generating agent disposed distal to the igniter.

With such a gas generator, the release mode of the combustion gas to the outside can be variously adjusted by the combustion of the first gas generating agent by actuation of the first igniter and the combustion of the gas generating agent by actuation of the igniter. Further, such a gas generator can also generate and release a relatively large amount of combustion gas to the outside. In this gas generator, the first combustion chamber is provided in the space on a side of the housing top surface, and the two igniters and the combustion chamber are provided in the space on a side of the housing bottom surface. Further, the accommodating wall surrounds the first igniter disposed on the housing bottom surface, and thus the first combustion chamber extends into a space on the side of the housing bottom surface (the combustion chamber is formed in the space). With the gas generator thus configured, the gas generating agent cannot be disposed uniformly around the igniter. As a result, non-uniformity readily occurs in the combustion of the gas generating agent. Here, by surrounding at least a portion of the cluster of the gas generating agent, the isolating part included in the gas generator described above forms the gas flow space between the isolating part and the inner wall surface of the housing on the combustion chamber side. As a result, the combustion product generated proximal to the igniter flows into the gas flow space from the portion of the plurality of communicating parts, flows through the gas flow space, and subsequently flows out from the another portion of the plurality of communicating parts and toward the gas generating agent disposed distal to the igniter. Thus, the gas generating agent disposed distal to the igniter is also burned in a relatively short period of time. In other words, even in a gas generator provided with a dividing wall that vertically divides the combustion chamber inside the housing, and two igniters disposed on the housing bottom surface, uniform combustion of the gas generating agent can be achieved. As a result, a favorable combustion gas generating capacity can be exhibited.

Here, in the gas generator described above, the gas generating agent may have a faster combustion rate than that of the first gas generating agent. In the gas generator described above, because the gas discharge port is formed in the housing on the side of the first combustion chamber, the combustion product generated by combustion of the gas generating agent is ultimately discharged from the gas discharge port via the first combustion chamber. Further, the combustion product generated by combustion of the gas generating agent flows into the first combustion chamber, thereby facilitating combustion of the first gas generating agent. Furthermore, according to the configuration described above, the gas generating agent generates the combustion product relatively rapidly once combustion is started. Accordingly, in the gas generator described above, the combustion product generated by combustion of the gas generating agent is efficiently used for combustion of the first gas generating agent. Thus, a favorable combustion gas generating capacity can be exhibited.

Furthermore, in the gas generator described above, the other portion of the plurality of communicating parts may be formed with opening areas increasing in size as a distal position from the igniter increases in distance. According to such a configuration, the more distal the gas generating agent is from the igniter, the more readily the gas generating agent is burned by the combustion product flowing through the gas flow space. Thus, a more uniform combustion of the gas generating agent can be achieved.

Advantageous Effects of Invention

According to the present invention, it is possible to achieve uniform combustion of a gas generating agent regardless of an arrangement of an igniter in a gas generator.

DESCRIPTION OF EMBODIMENTS

A gas generator according to an embodiment of the present invention will be described below with reference to the drawings. Note that configurations of the following embodiment are provided as examples, and the present invention is not limited to the configurations of the embodiment.

Example 1

Figure 1:
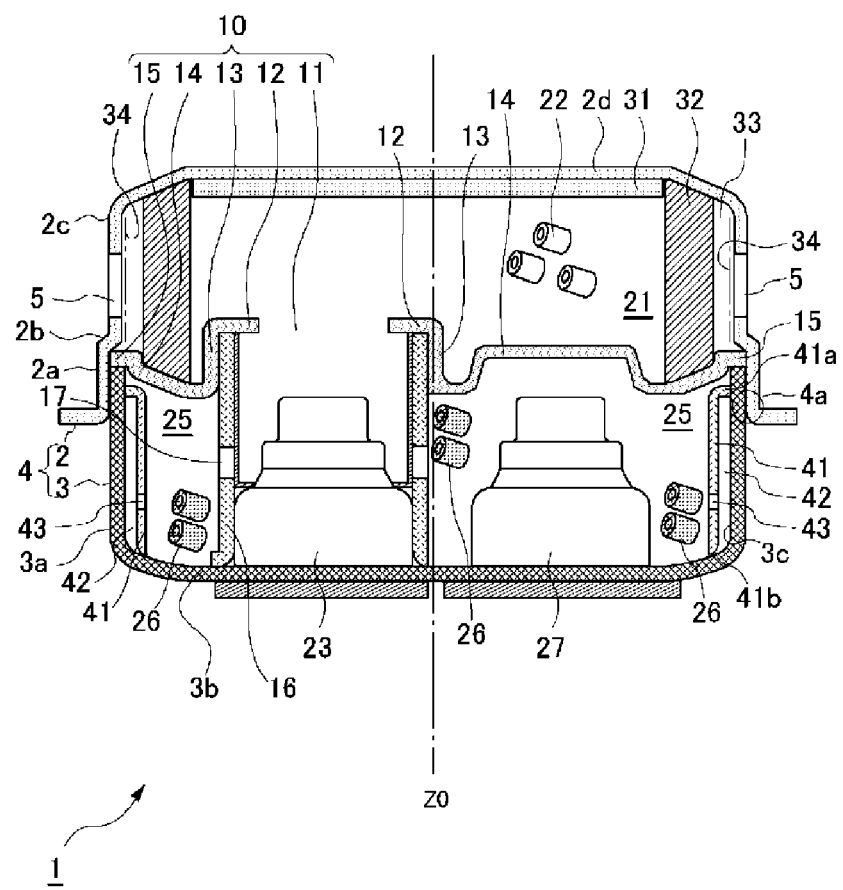
FIG. 1 is a first schematic representation of a configuration of a gas generator according to an embodiment of the present invention.

FIG. 1 is a cross-sectional view in a height direction of a gas generator 1. Note that Z0 in FIG. 1 represents a center axis in the height direction (axial direction) of the gas generator 1. The gas generator 1 is configured to burn a gas generating agent with which a housing 4 formed by an upper shell 2 and a lower shell 3 is filled and to discharge a combustion gas. Further, the gas generator 1 is a so-called dual-type gas generator including two combustion chambers disposed on an upper side and a lower side, respectively, and each of the two combustion chambers includes an igniter and a gas generating agent that correspond to each of the combustion chambers, as described below. Here, the upper shell 2 includes a peripheral wall 2c and a top surface 2d which form a recessed internal space. The internal space is a first combustion chamber 21 filled with a first gas generating agent 22. Further, the top surface 2d and a bottom surface 3b of the lower shell 3 described below are substantially circular when viewed from above. The peripheral wall 2c and a peripheral wall 3a of the lower shell 3 described below surround the top surface 2d and the bottom surface 3b, respectively, and extend substantially perpendicularly from the corresponding surfaces to form annular wall surfaces. The top surface 2d is connected to one end of the peripheral wall 2c, and the other end of the peripheral wall 2c serves as an opening of the upper shell 2. Further, on the other end side of the peripheral wall 2c, a mating wall 2a and an abutting portion 2b are provided in this order from the opening. The radius of the internal space formed by the mating wall 2a is larger than the radius of the internal space formed by the peripheral wall 2c on a side nearer to the top surface 2d, and the mating wall 2a connects to the peripheral wall 2c, with the abutting portion 2b interposed therebetween.

Furthermore, the lower shell 3 includes the peripheral wall 3a and the bottom surface 3b which form a recessed internal space. The internal space is a second combustion chamber 25 filled with a second gas generating agent 26. The bottom surface 3b is connected to one end of the peripheral wall 3a, and the other end of the peripheral wall 3a serves as an opening of the lower shell 3. The radius of the internal space formed by the peripheral wall 3a is substantially the same as the radius of the internal space formed by the peripheral wall 2c of the upper shell 2. The bottom surface 3b of the lower shell 3 is provided with a hole in which a first igniter 23 is fixed and a hole in which a second igniter 27 is fixed.

Further, in the housing 4, a dividing wall 10 is disposed between the upper shell 2 and the lower shell 3. The dividing wall 10 includes a terminating end 15, a dividing wall part 14 connected to the terminating end 15 and substantially dividing the inside of the housing 4 into upper and lower spaces, a peripheral wall 13 connected to the dividing wall part 14 and extending along an accommodating wall member (accommodating wall) 16 described below, and an end 12 disposed partially covering the opening of the accommodating wall member 16. Note that the end 12 forms a through hole 11. Further, the accommodating wall member 16 having a tubular shape is provided on the bottom surface 3b to surround the periphery of the first igniter 23 attached to the bottom surface 3b of the lower shell 3 in the height direction thereof. An opening above the accommodating wall member 16 is covered by the end 12 of the dividing wall 10. In addition, a through hole 17 is provided in the accommodating wall member 16, and the through hole 17 allows communication between two spaces (the first combustion chamber 21 and a second combustion chamber 25) resulting from division by the dividing wall 10.

In a state where the divider wall 10 is attached on the lower shell 3 in the above-described manner, the upper shell 2 is further attached from above. As described above, since the radius of the internal space formed by the mating wall 2a of the upper shell 2 is larger than the radius of the internal space formed by the peripheral wall 2c, the upper shell 2 is mated with the lower shell 3, and thus the abutting portion 2b is abutted on the terminating end 15 of the dividing wall 10. Note that, in the housing 4, at a site of mating or contact between the upper shell 2 and the lower shell 3, the upper shell 2 and the lower shell 3 are joined by any joining method (for example, welding) suitable in terms of moisture prevention, etc. for the gas generating agent filled in the housing 4.

As described above, the internal space of the housing 4 is substantially divided, by the divider wall 10, into two spaces positioned on the upper side and the lower side, respectively. In the internal space of the housing 4, in the first combustion chamber 21 defined by the upper shell 2 and the dividing wall 10, there are the first igniter 23, and the first gas generating agent 22, and in the second combustion chamber 25 defined by the lower shell 3 and the dividing wall 10, there are the second igniter 27 and the second gas generating agent 26. In this way, the gas generator 1 is configured as a dual-type gas generator including two igniters, i.e., the first igniter 23 and the second igniter 27. Note that the first igniter 23 and the second igniter 27 are both fixed on the bottom surface 3b of the lower shell 3, and thus the first igniter 23 is housed in a state in which the side of the first igniter 23 is surrounded by the accommodating wall member 16.

Here, in the first combustion chamber 21, while the first igniter 23 is accommodated in the internal space of the accommodating wall member 16 (the space defined by the accommodating wall member 16 and the bottom surface 3b of the lower shell 3 and opening upward), and the upper space is filled with the first gas generating agent 22, a filter 32 having an annular shape is disposed surrounding the first gas generating agent 22. At this time, the first gas generating agent 22 is filled in a state of being pressed, by a biasing force applied by a cushion 31, against the filter 32, the dividing wall part 14, and the like and thus, undesired vibration of the first gas generating agent 22 in the first combustion chamber 21 does not occur. The first gas generating agent 22 used is a gas generating agent having a relatively low combustion temperature. It is preferable that the first gas generating agent 22 has a combustion temperature in the range from 1000 to 1700° C. As the first gas generating agent 22, a single hole cylindrical gas generating agent including guanidine nitrate (41 wt %), basic copper nitrate (49 wt %), and a binder and an additive, for example, may be used. Note that, in order to improve the ignitability of the first gas generating agent 22, the gas generator 1 may contain a predetermined gas generating agent with a relatively high combustion temperature (for example, a gas generating agent having a composition including a nitroguanidine and strontium nitrate) in the internal space of the accommodating wall member 16.

The filter 32 is configured by stacking flat woven meshes made of stainless steel in the radial direction and compressing the meshes in the radial and axial directions. The filter 32 is configured to cool the combustion gas from the first gas generating agent 22 and collect combustion residue included in the combustion gas. Alternatively, a filter having a wire-wound-type structure, in which a wire is wound forming multiple layers on a core rod, may be used as the filter 32. Note that the filter 32 also collects the combustion residue of the second gas generating agent 26 filled in the second combustion chamber 25. In addition, a gap 33 formed between the peripheral wall 2c of the upper shell 2 and the filter 32 forms a gas passage that surrounds the filter 32 and has an annular shape in the radial direction in cross sectional view. The gap 33 allows the combustion gas to pass through the entire area of the filter 32, and thus it is possible to achieve effective utilization of the filter 32 and effective cooling and purification of the combustion gas. The combustion gas flowing through the gap 33 reaches a gas discharge port 5 provided in the peripheral wall 2c. In addition, to prevent moisture from entering the housing 4 from outside, the gas discharge port 5 is closed, by an aluminum tape 34, from the inside of the housing 4 until the gas generator 1 is actuated.

Further, the second combustion chamber 25 is filled with the second gas generating agent 26 correspondingly to the second igniter 27 fixed to the bottom surface 3b of the lower shell 3. The second gas generating agent 26 is also filled in a state of being biased by a cushioning member (not illustrated), and thus undesired vibration of the second gas generating agent 26 in the second combustion chamber 25 does not occur. Further, similar to the first gas generating agent 22, for the second gas generating agent 26 as well, a single hole cylindrical gas generating agent including guanidine nitrate (41 wt %), basic copper nitrate (49 wt %), and a binder and an additive, for example, may be used.

With such a configuration, in the gas generator 1, the mode of release of the combustion gas to the outside can be variously adjusted by the combustion of the first gas generating agent 22 caused by actuation of the first igniter 23 and combustion of the second gas generating agent 26 caused by actuation of the second igniter 27. Further, a relatively large amount of combustion gas can be generated and released to the outside. However, in the dual type gas generator 1, as illustrated in FIG. 1, the first igniter 23 and the second igniter 27 are disposed in the recessed internal space formed by the lower shell 3, and the first combustion chamber 21 extends into the internal space, surrounding the first igniter 23. Thus, the second gas generating agent 26 cannot be disposed uniformly around the second igniter 27. As a result, there is a possibility that non-uniformity will occur in the combustion of the gas generating agent, and the output characteristics of the gas generator 1 will deviate from expectations.

Here, in the gas generator 1, an O-shaped isolating member 41 is disposed inside the second combustion chamber 25. This O-shaped isolating member 41 surrounds a cluster of the second gas generating agent 26, thereby forming a gas flow space 42 between the O-shaped isolating member 41 and the inner wall surface 3c of the lower shell 3, in which the gas generating agent is not filled. Specifically, the O-shaped isolating member 41 is a ring-shaped member such as that illustrated in FIG. 2, and includes a collar 41a, a lower end 41b, and a peripheral wall 41c. Further, the O-shaped isolating member 41 is disposed in a recessed internal space formed by the lower shell 3, abutting the collar 41a and the lower end 41b against the inner wall surface 3c of the lower shell 3, and thereby forming the gas flow space 42 between the O-shaped isolating member 41 and the inner wall surface 3c of the lower shell 3. This gas flow space 42 is a space isolated from the second combustion chamber 25 by the O-shaped isolating member 41, and the gas flow space 42 is in communication with the second combustion chamber 25 only by a communicating hole described below.

Figure 2:
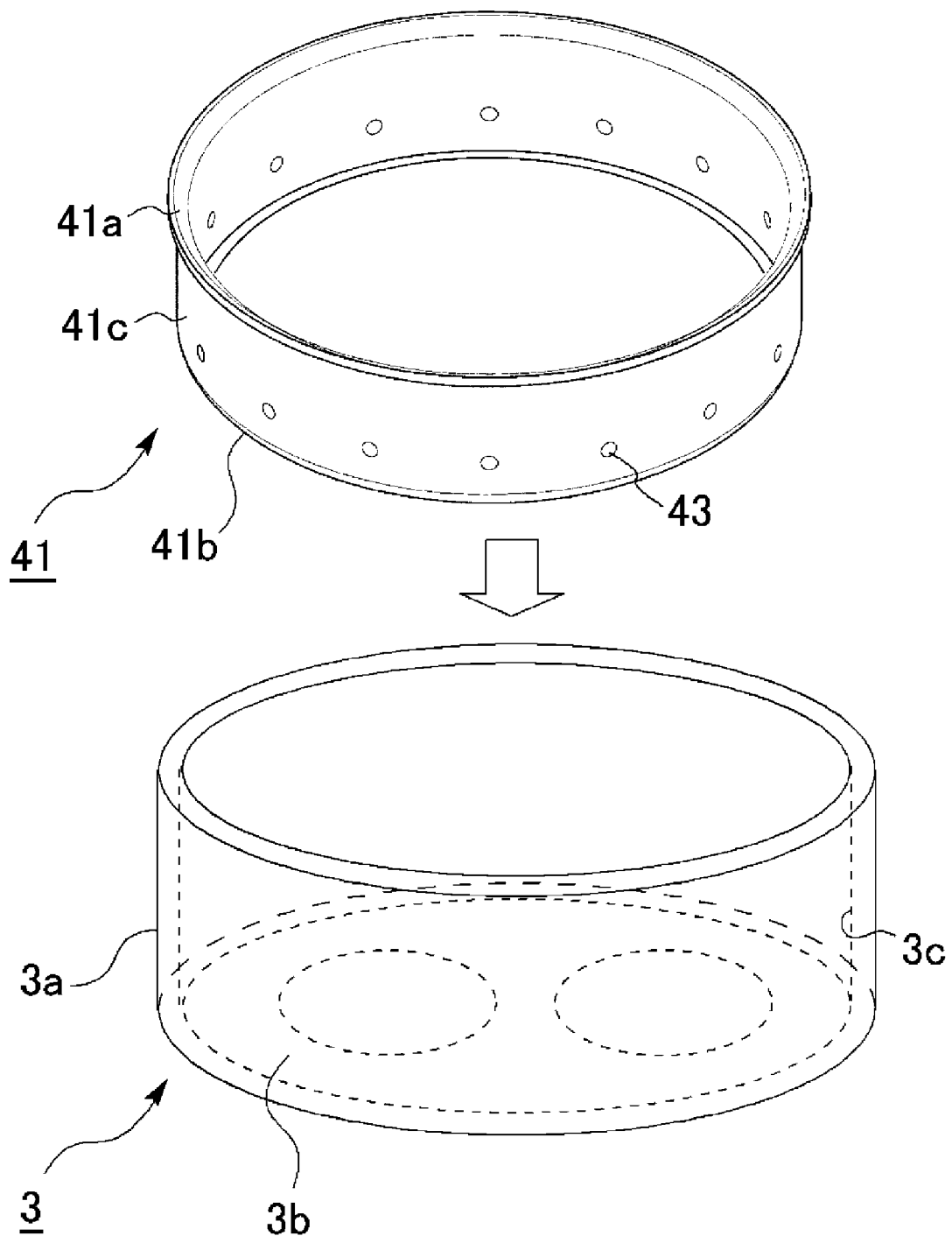
FIG. 2 is a schematic representation of a configuration of an O-shaped isolating member to be applied to the gas generator illustrated in FIG. 1.

In the O-shaped isolating member 41, a communicating hole is formed that connects the second combustion chamber 25 and the gas flow space 42, with the O-shaped isolating member 41 disposed inside the second combustion chamber 25. As illustrated in FIG. 2, a plurality of the communicating holes are formed across the entire circumference in the circumferential direction of the O-shaped isolating member 41, and these communicating holes are collectively referred to as "a plurality of communicating holes 43." Note that while, in the present example, the second combustion chamber 25 and the gas flow space 42 are connected by holes, the present invention is not intended to be limited thereto and, for example, the second combustion chamber 25 and the gas flow space 42 may communicate with each other by slits.

In the gas generator 1 thus configured, a portion of the combustion product, such as combustion gas generated by combustion of the second gas generating agent 26 disposed proximal to the second igniter 27, is flowed into the gas flow space 42 via a portion of the plurality of communicating holes 43. Then, the combustion product flowing through the gas flow space 42 is flowed out toward the second gas generating agent 26 disposed distal to the second igniter 27 via the other communicating holes of the plurality of communicating holes 43. Thus, uniform combustion of the gas generating agent can be achieved. This will be described in detail below.

Figure 3A:
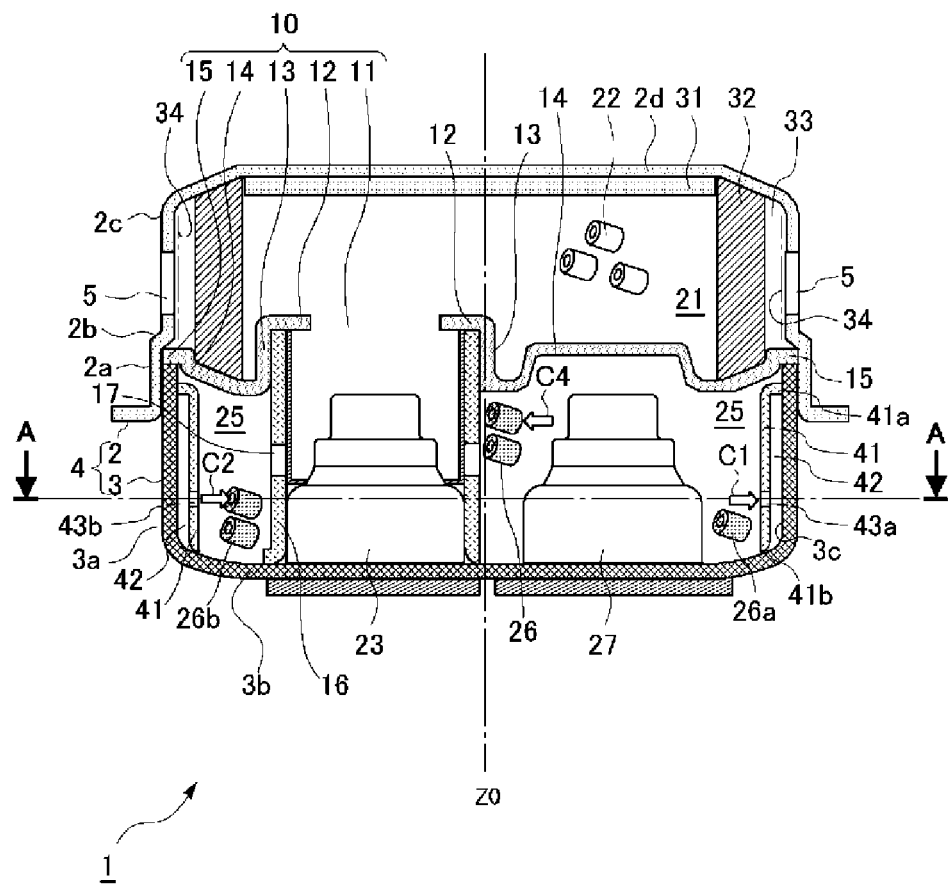
FIG. 3A is a first diagram illustrating a state where a combustion product generated by combustion of a second gas generating agent moves between a second combustion chamber and a gas flow space in the gas generator illustrated in FIG. 1.
Figure 3B:
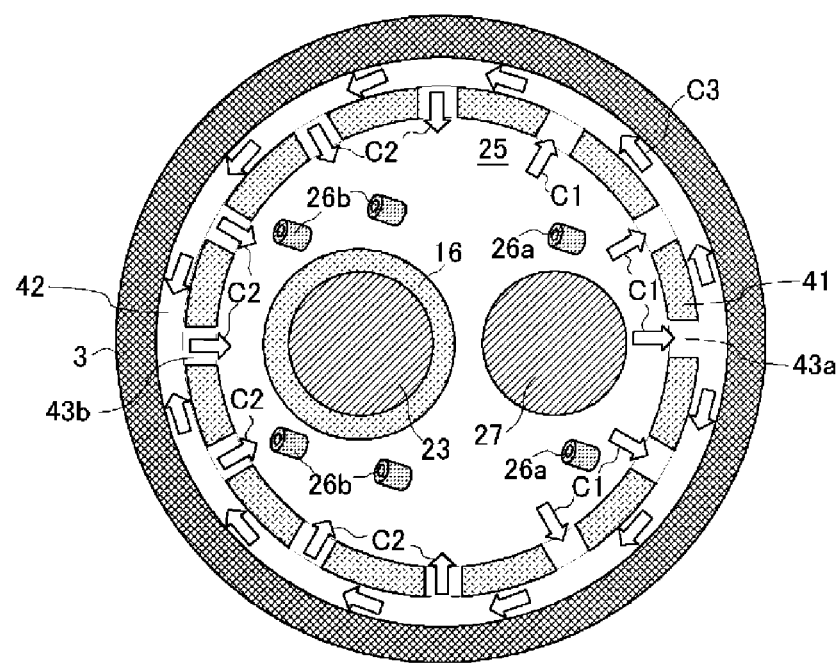
FIG. 3B is a second diagram illustrating a state where a combustion product generated by combustion of the second gas generating agent moves between the second combustion chamber and the gas flow space in the gas generator illustrated in FIG. 1.

FIG. 3A and FIG. 3B illustrate a state where a portion of the combustion product such as the combustion gas generated by combustion of the second gas generating agent 26 moves between the second combustion chamber 25 and the gas flow space 42, and indicate the flow of the combustion as by arrows C1, C2, C3. Note that FIG. 3A is a cross-sectional view in a height direction of the gas generator 1, and FIG. 3B is a cross-sectional view (transverse cross-sectional view) of the gas generator 1 along line A-A of FIG. 3A. Further, the combustion process of the second gas generating agent 26 in the gas generator 1 according to the present example will be described on the basis of FIG. 3A and FIG. 3B.

When the second igniter 27 is actuated, first, a second gas generating agent 26a disposed proximal to the second igniter 27 burns. In doing so, a combustion product is generated by combustion of the second gas generating agent 26a proximal to the second igniter 27 inside the second combustion chamber 25. This combustion product is subsequently spread not only throughout the second combustion chamber 25, but also throughout the gas flow space 42 via a portion of the plurality of communicating parts 43. Here, in FIG. 3A and FIG. 3B, the flow of the combustion product flowing into the gas flow space 42 from the second combustion chamber 25 is indicated by the arrow C1. Further, as indicated by the arrow C1 in FIG. 3B, the inflow of the combustion product from the second combustion chamber 25 into the gas flow space 42 is performed via the communicating holes that, among the plurality of communicating holes 43, are relatively proximal to the second igniter 27. Hereinafter, the communicating holes that, among the plurality of communicating holes 43, allow the combustion product to flow from the second combustion chamber 25 to the gas flow space 42 are referred to as "inflow holes 43a." Note that the mode of movement of the combustion product illustrated by FIGS. 3A and 3B is merely an example of an embodiment of the present invention.

Then, as illustrated by the arrow C3 in FIG. 3B, the combustion product flowing into the gas flow space 42 flows through the gas flow space 42. Here, the gas flow space 42 is not filled with the gas generating agent. Therefore, compared to the second combustion chamber 25 in which the second gas generating agent 26 is densely filled and the flow of the combustion product is prevented by the second gas generating agent 26 thus filled, the gas flow space 42 is in a state where the combustion product is readily diffused. Thus, the combustion product generated proximal to the second igniter 27 can diffuse more rapidly from the second igniter 27 when a portion thereof flows through the gas flow space 42 (indicated by the arrows C1, C2, C3 in FIG. 3A and FIG. 3B) than when a portion thereof flows through the second combustion chamber 25 (indicated by an arrow C4 in FIG. 3A). Further, as illustrated by the arrow C2 in FIG. 3B, the combustion product flowing through the gas flow space 42 flows out from the communicating holes 43 that, among the plurality of communicating holes 43, are relatively distal to the second igniter 27 (hereinafter referred to as "outflow holes 43b") to the second combustion chamber 25. In other words, the combustion product flowing into the gas flow space 42 via the inflow holes 43a and flowing through the gas flow space 42 flows toward the second gas generating agent 26 disposed distal to the second igniter 27 via the outflow holes 43b. As a result, a portion of the combustion product generated proximal to the second igniter 27 can reach the second gas generator 26 disposed distal to the second igniter 27 as rapidly as possible. As a result, not only the second gas generating agent 26 disposed proximal to the second igniter 27, but also the second gas generating agent 26 disposed distal to the second igniter 27 are burned in a relatively short period of time.

Furthermore, as described above, the gas discharge port 5 of the gas generator 1 is provided in the peripheral wall 2c of the upper shell 2, and an opening through which the combustion gas is released to the outside is not provided in the inner wall surface 3c of the lower shell 3 forming the gas flow space 42 together with the O-shaped isolating member 41. Thus, the combustion product flowing through the gas flow space 42 further flows through the combustion chamber 25, the first combustion chamber 21, and the gap 33, and is subsequently discharged from the gas discharge port 5. Accordingly, the combustion product flowing through the gas flow space 42 is efficiently guided to the second gas generating agent 26 disposed distal to the second igniter 27.

In the gas generator 1 described above, the upper shell 2 and the lower shell 3 of the housing 4 may be integrated by welding. In this case, the welding of the upper shell 2 and the lower shell 3 is performed on a predetermined welded part 4a illustrated in FIG. 1. The predetermined welded part 4a is an area where the mating wall 2a of the upper shell 2 is fitted with the peripheral wall 3a of the lower shell 3, and the gas flow space 42 is formed on the side opposite to the mating wall 2a side of the peripheral wall 3a of the lower shell 3. According to such a configuration, the heat transfer of the welding heat to the second combustion chamber 25 is suppressed by the gas flow space 42. Thus, the second gas generating agent 26 filled in the second combustion chamber 25 can be suppressed from being unintentionally burned by the welding heat.

Further, in the gas generator 1 described above, the second gas generating agent 26 may be configured to have a faster combustion rate than that of the first gas generating agent 22. In this case, in a single hole cylindrical gas generating agent, for example, a particle size of the second gas generating agent 26 is smaller than a particle size of the first gas generating agent 22. Alternatively, for example, a known combustion accelerator may be added to the second gas generating agent 26. According to such a configuration, the second gas generating agent 26 generates the combustion product relatively rapidly once combustion is started. Thus, in such a gas generator 1, the combustion product generated by combustion of the second gas generating agent 26 is efficiently used for combustion of the first gas generating agent 22.

According to the gas generator 1 described above, the second gas generating agent 26 disposed distal to the second igniter 27 can also be burned in a relatively short period of time. Thus, uniform combustion of the gas generating agent can be achieved. As a result, the gas generator 1 can exhibit a favorable combustion gas generating capability.

First Modified Example of Example 1

Figure 4:
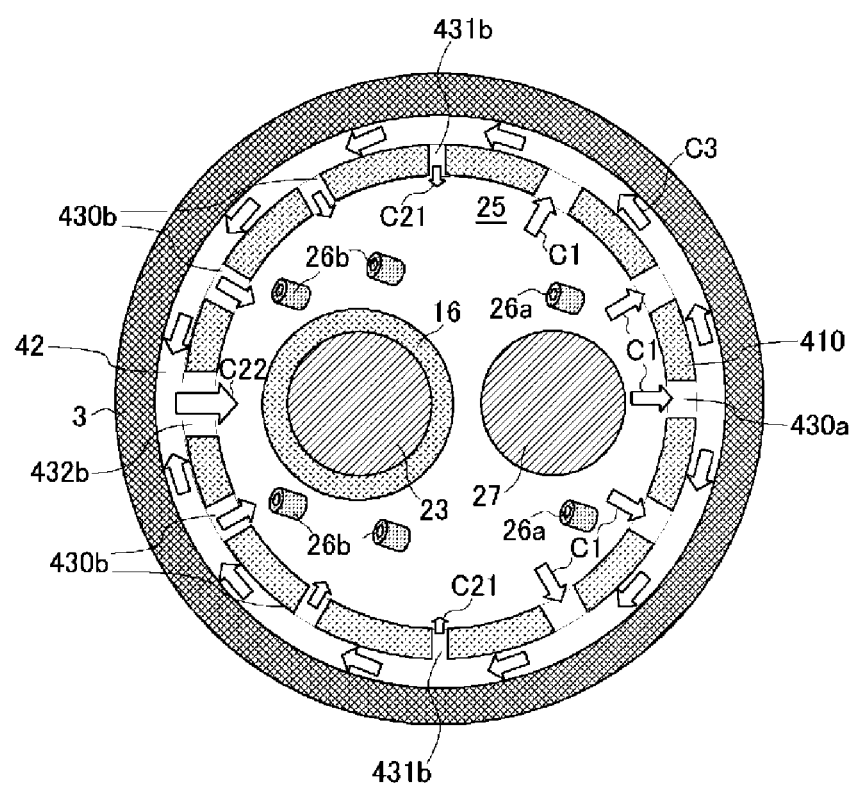
FIG. 4 is a diagram illustrating a state where a combustion product generated by combustion of the second gas generating agent moves between the second combustion chamber and the gas flow space in a first modified example of example 1 of the present invention.

Next, a first modified example of Example 1 described above will be described on the basis of FIG. 4. Note that, in the present modified example, detailed descriptions of components substantially the same as those of example 1 described above are omitted. FIG. 4 is a diagram (transverse cross-sectional view of the gas generator 1) corresponding to FIG. 3B described above, and illustrates a state where a portion of the combustion product such as the combustion gas generated by combustion of the second gas generating agent 26 moves between the second combustion chamber 25 and the gas flow space 42. Note that the arrows C1, C2, and C3 illustrated in FIG. 4 are as described above in the explanation of FIG. 3B.

In the gas generator 1 according to this modified example, an O-shaped isolating member 410 is disposed inside the second combustion chamber 25. This O-shaped isolating member 410 is configured in the same way as the O-shaped isolating member 41 described above, and includes a plurality of communicating holes that connect the second combustion chamber 25 and the gas flow space 42, with the O-shaped isolating member 41 disposed inside the second combustion chamber 25. Here, given that the communicating holes relatively proximal to the second igniter 27 and through which the combustion product flows from the second combustion chamber 25 and into the gas flow space 42 are referred to as inflow holes 430a, and communicating holes relatively distal from the second igniter 27 and through which the combustion product flowing through the gas flow space 42 flows out to the second combustion chamber 25 are referred to as outflow holes 430b, the outflow holes 430b increases in size as the distal position from the second igniter 27 increases in distance. In other words, the outflow holes 430b are formed with opening areas increasing in size as the distal position from the second igniter 27 increases in distance.

In particular, the outflow holes 430b are formed, making the combustion product flowing out toward the second gas generator 26 (indicated by an arrow C22 in FIG. 4) via the outflow holes (indicated as outflow holes 432b in FIG. 4) that, among the outflow holes 430b, are relatively distal to the second igniter 27 have a faster flow rate than the combustion product flowing out toward the second gas generating agent 26 (indicated by an arrow C21 in FIG. 4) via the outflow holes (indicated as outflow holes 431b in FIG. 4) that, among the outflow holes 430b, are relatively proximal to the second igniter 27. Alternatively, in view of the fact that the flow rate of the combustion product flowing through the gas flow space 42 decreases as the distal position of the outflow hole 430b from the second igniter 27 increases in distance, the outflow holes 430b are formed, making the amount of the combustion product passing through the outflow hole 431b and the amount of the combustion product passing through the outflow hole 432b substantially uniform. As a result, the second gas generating agent 26, even when disposed distally from the second igniter 27, can be readily burned in a favorable manner by the combustion product flowing out from the gas flow space 42 toward the second gas generating agent 26 via the outflow holes 430b. Thus, a more uniform combustion of the gas generating agent can be achieved.

Second Modified Example of Example 1

Figure 5:
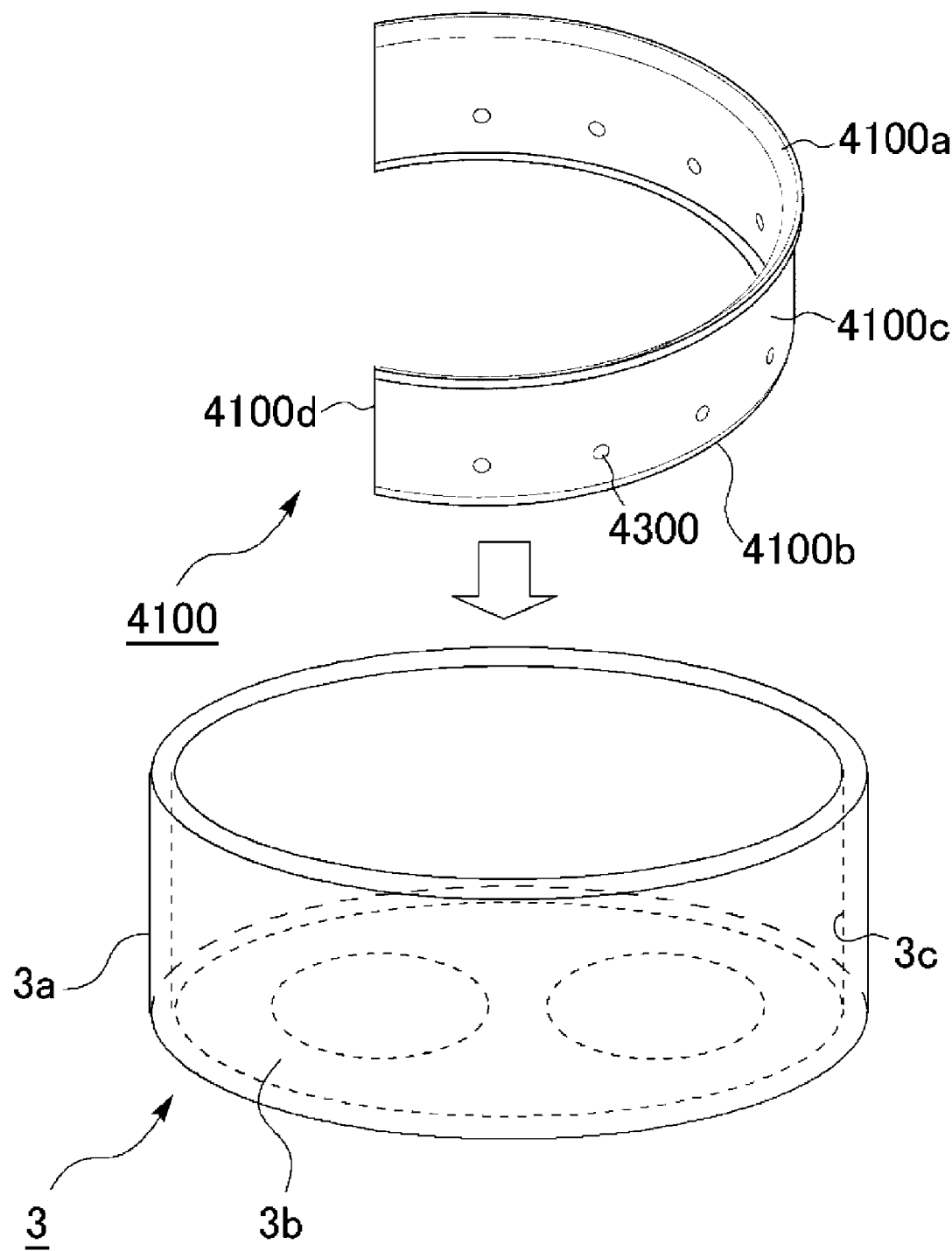
FIG. 5 is a schematic representation of a configuration of a C-shaped isolating member according to a second modified example of example 1 of the present invention.

Next, a second modified example of example 1 described above will be described on the basis of FIG. 5 and FIG. 6. Note that, in the present modified example, detailed descriptions of components substantially the same as those of example 1 described above are omitted. FIG. 5 is a schematic representation of a configuration of a C-shaped isolating member 4100 according to this modified example. This C-shaped isolating member 4100 has a C-shape formed by cutting the O-shaped isolating member 41 having the ring shape illustrated in FIG. 2 described above.

Further, the C-shaped isolating member 4100 is disposed inside the second combustion chamber 25. This C-shaped isolating member 4100 surrounds a portion the cluster of the second gas generating agent 26, thereby forming the gas flow space 42 between the C-shaped isolating member 4100 and the inner wall surface 3c of the lower shell 3. Specifically, as illustrated in FIG. 5, the C-shaped isolating member 4100 includes a collar 4100a, a lower end 4100b, a peripheral wall 4100c, and a side end 4100d. Further, the C-shaped isolating member 4100 is disposed in a recessed interior space formed by the lower shell 3, abutting the collar 4100a and the lower end 4100b against the inner wall surface 3c of the lower shell 3, and thereby forming the gas flow space 42 between the C-shaped isolating member 4100 and the inner wall surface 3c of the lower shell 3. Note that, in the C-shaped isolating member 4100, a plurality of communicating holes 4300 are formed that connect the second combustion chamber 25 and the gas flow space 42, with the C-shaped isolating member 4100 disposed inside the second combustion chamber 25.

Figure 6:
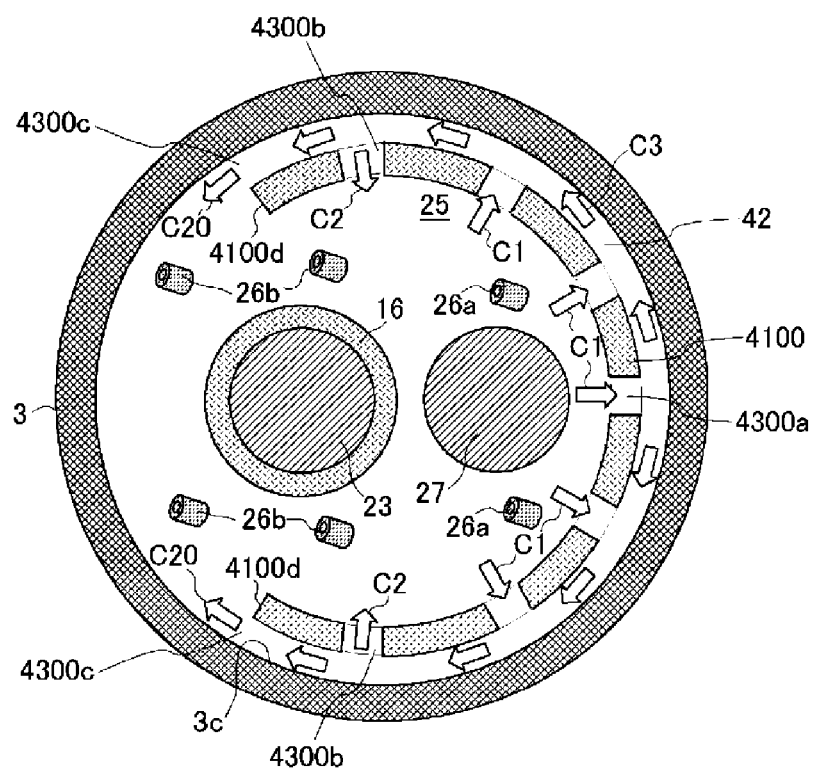
FIG. 6 is a diagram illustrating a state where a combustion product generated by combustion of the second gas generating agent moves between the second combustion chamber and the gas flow space in the gas generator to which the C-shaped isolating member illustrated in FIG. 5 is applied.

Further, FIG. 6 is a diagram (transverse cross-sectional view of the gas generator 1) corresponding to FIG. 3B described above, and illustrates a state where a portion of the combustion product such as the combustion gas generated by combustion of the second gas generating agent 26 moves between the second combustion chamber 25 and the gas flow space 42. A portion of the combustion product generated proximal to the second igniter 27 flows into the gas flow space 42 via the communicating holes that, among the plurality of communicating holes 4300, are relatively proximal to the second igniter 27 (hereinafter referred to as "inflow holes 4300a"), as indicated by the arrow C1 in FIG. 6. Further, as illustrated by the arrow C2 in FIG. 6, the combustion product flowing through the gas flow space 42 (indicated by the arrow C3 in FIG. 6) flows out from the communicating holes that, among the plurality of communicating holes 4300, are relatively distal to the second igniter 27 (hereinafter referred to as "outflow holes 4300b") to the second combustion chamber 25. Further, as illustrated by an arrow C20 in FIG. 6, the combustion product flows out to the second combustion chamber 25 from an opening 4300c defined by the side end 4100d provided in the C-shaped isolating member 4100 and the inner wall surface 3c of the lower shell 3.

Then, the combustion product flowing into the gas flow space 42 via the inflow hole 4300a and through the gas flow space 42 flows outward toward the second gas generating agent 26 disposed distal to the second igniter 27 via the outflow hole 4300b and the opening 4300c, allowing a portion of the combustion product generated proximal to the second igniter 27 to reach the second gas generating agent 26 disposed distal to the second igniter 27 as rapidly as possible. As a result, the second gas generating agent 26 disposed distal to the second igniter 27 is also burned in a relatively short period of time. In this way, the C-shaped isolating member 4100 can also form the flow of the combustion product described above by surrounding a portion rather than an entirety of the cluster of the second gas generating agent 26, and thus exhibit the effect of the present invention.

Example 2

Figure 7:
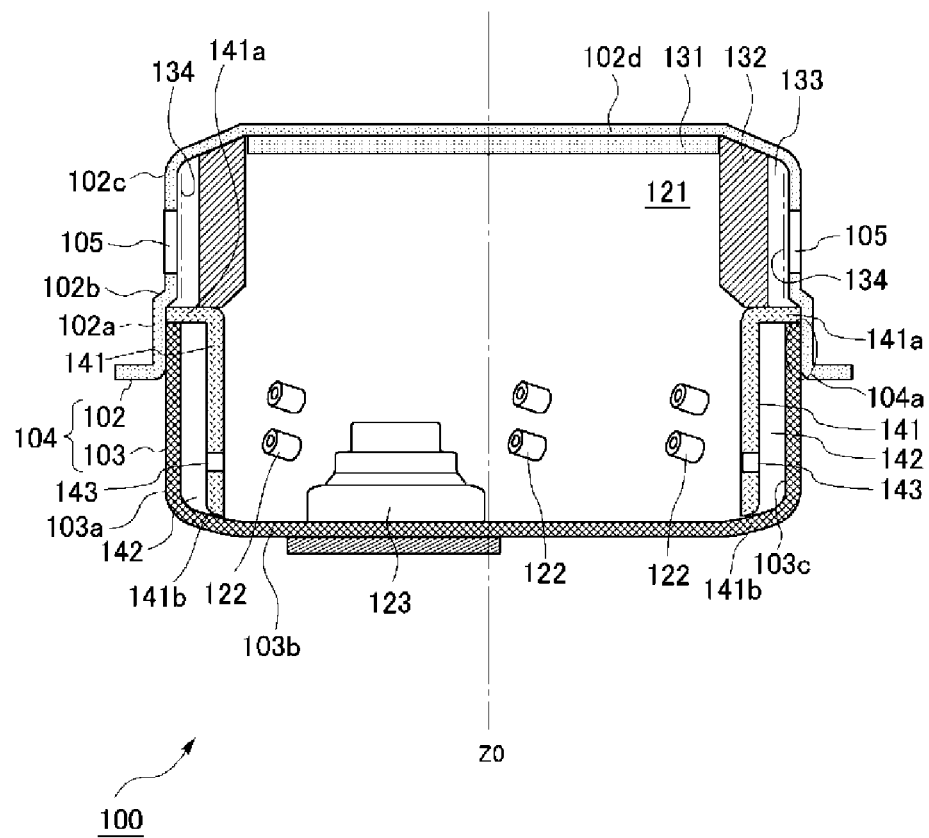
FIG. 7 is a second schematic representation of a configuration of a gas generator according to an embodiment of the present invention.
Figure 8:
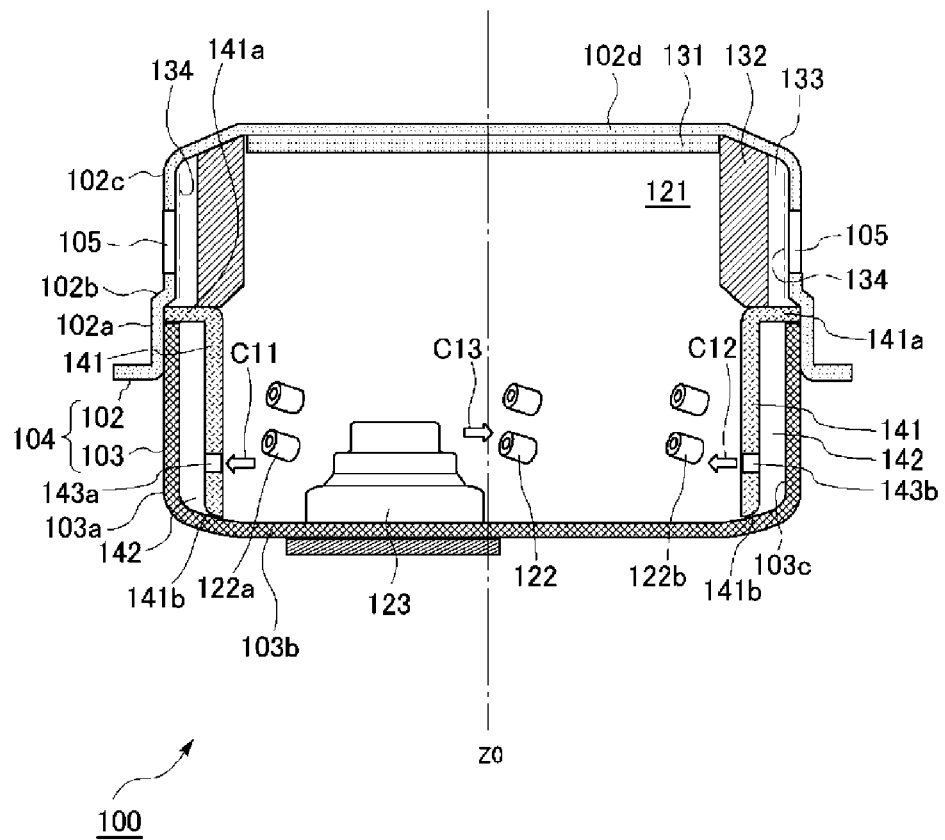
FIG. 8 is a diagram illustrating a state where a combustion product generated by combustion of a gas generating agent moves between a combustion chamber and a gas flow space in the gas generator illustrated in FIG. 7.

Next, a second example of the present invention will be described on the basis of FIG. 7 and FIG. 8. Note that, in the present example, detailed descriptions of components substantially the same as those of example 1 described above are omitted. FIG. 7 is a cross-sectional view in a height direction of a gas generator 100. Note that Z0 in FIG. 7 represents a center axis in the height direction (axial direction) of the gas generator 100.

The gas generator 100 is configured to burn a gas generating agent with which a housing 104 formed by an upper shell 102 and a lower shell 103 is filled, and release a combustion gas. Note that the upper shell 102 includes a mating wall 102a, an abutting portion 102b, a peripheral wall 102c, and a top surface 102d, which are configured in the same manner as in the gas generator 1 illustrated in FIG. 1 described above. Further, the lower shell 103 includes a peripheral wall 103a and a bottom surface 103b, which form an internal space having a concave shape. The bottom surface 103b is connected to a first end side of the peripheral wall 103a, and a second end side thereof serves as an opening of the lower shell 103. The radius of the internal space formed by the peripheral wall 103a is substantially the same as the radius of the internal space formed by the peripheral wall 102c of the upper shell 102. The bottom surface 103b of the lower shell 103 is provided with a hole in which a first igniter 123 is fixed.

Here, the upper shell 102 is fitted with the lower shell 103 to form a closed space inside the housing 104. This closed space serves as a combustion chamber 121. Note that the upper shell 102 is fitted with the lower shell 103 until the abutting portion 102b thereof abuts against a collar 141a of an O-shaped isolating member 141 described below. Further, in the housing 104, at a site of mating or contact between the upper shell 102 and the lower shell 103, the upper shell 102 and the lower shell 103 are joined by any joining method (for example, welding) suitable in terms of moisture prevention, etc., for the gas generating agent filled in the housing 4. Here, similar to the gas generator 1 illustrated in FIG. 1 described above, the upper shell 102 and the lower shell 103 of the housing 104 may be integrated by welding at a predetermined welded part 104a described above.

Further, a gas generating agent 122 and the igniter 123 are disposed in the combustion chamber 121. Furthermore, a filter 132 having an annular shape is disposed surrounding the gas generating agent 122. Note that the filter 132 is configured similarly to the gas generator 1 illustrated in FIG. 1 described above. At this time, the gas generating agent 122 is filled in a state of being pressed to the filter 132, the bottom surface 103b of the lower shell 103, and the like by a biasing force of a cushion 131 to ensure that vibration of the gas generating agent 122 does not occur unnecessarily inside the combustion chamber 121. It is preferable that the gas generating agent 122 has a combustion temperature in the range of 1000 to 1700° C. As the gas generating agent 122, a single hole cylindrical gas generating agent including guanidine nitrate (41 wt %), basic copper nitrate (49 wt %), and a binder and an additive, for example, may be used. Further, similar to the gas generator 1 illustrated in FIG. 1 described above, a gap 133 is formed between the peripheral wall 102c of the upper shell 102 and the filter 132. The combustion gas flowing through the gap 133 reaches a gas discharge port 105 provided in the peripheral wall 102c. Note that the gas discharge port 105 is closed, by an aluminum tape 134, from the inside of the housing 104.

According to such a configuration, in the gas generator 100, combustion gas can be released from the gas discharge port 105 provided in the peripheral wall 102c to the outside by combustion of the gas generating agent 122 due to actuation of the igniter 123. However, in a case that the center of the cluster of the gas generating agent 122 substantially coincides with the central axis Z0 of the gas generator 100 with the igniter 123 disposed shifted from the central axis Z0 of the gas generator 100 (the state illustrated in FIG. 7, for example), non-uniformity may occur in the combustion of the gas generating agent 122, resulting in the output characteristics of the gas generator 100 deviated from expectations.

Here, in the gas generator 100, the O-shaped isolating member 141 is disposed inside the combustion chamber 121. The O-shaped isolating member 141 is configured similarly to the O-shaped isolating member 41 illustrated in FIG. 2 described above, and includes the collar 141a, a lower end 141b, and a peripheral wall 141c. Further, similar to the gas generator 1 illustrated in FIG. 1 described above, the O-shaped isolating member 141 forms a gas flow space 142 having an annular shape between the O-shaped isolating member 141 and an inner wall surface 103c of the lower shell 103. This gas flow space 142 is in communication with the combustion chamber 121 only by a plurality of communicating holes 143. Further, the gas flow space 142 and the gap 133 are separated by the collar 141a. Note that the gas discharge port 105 is not formed in the inner wall surface 103c of the lower shell 103 facing the O-shaped isolating member 141, and thus the combustion product flowing through the gas flow space 142 flows through the combustion chamber 121 and the gap 133, and is further subsequently discharged from the gas discharge port 105.

Further, similar to the O-shaped isolating member 41 illustrated in FIG. 2 described above, the plurality of communicating holes 143 are formed in the O-shaped isolating member 141. Here, as illustrated by an arrow C11 in FIG. 8, the combustion product generated by combustion of a gas generating agent 122a disposed proximal to the igniter 123 not only spreads throughout the combustion chamber 121, but also flows into the gas flow space 142 by a portion (hereinafter referred to as "inflow holes 143a") of the plurality of communicating holes 143. Then, as illustrated by an arrow C12 in FIG. 8, the combustion product flowing through the gas flow space 142 is discharged toward a gas generating agent 122b disposed distal to the igniter 123 by the other communicating holes (hereinafter referred to as "outflow holes 143b") of the plurality of communicating holes 143. At this time, the combustion product generated proximal to the igniter 123 can distally diffuse more rapidly from the igniter 123 when a portion thereof flows through the gas flow space 142 (indicated by the arrows C11, C12 in FIG. 8) than when a portion thereof flows through the combustion chamber 121 (indicated by an arrow C13 in FIG. 8). This is because the gas generating agent is not filled in the gas flow space 142 while the gas generating agent 122 is densely filled in the combustion chamber 121, and thus, in the combustion chamber 121, the flow of the combustion product is hindered by the gas generating agent 122 filled therein. Accordingly, a portion of the combustion product generated proximal to the igniter 123 flows through the gas flow space 142, thereby causing the combustion product to reach the gas generating agent 122b disposed distal to the igniter 123 as rapidly as possible. As a result, not only the gas generating agent 122a disposed proximal to the igniter 123, but also the gas generating agent 122b disposed distal to the igniter 123 are burned in a relatively short period of time. Note that the outflow holes 143b may be formed with openings increasing in size as the distal position from the second igniter 123 increases in distance.

Modified Example of Example 2

Figure 9:
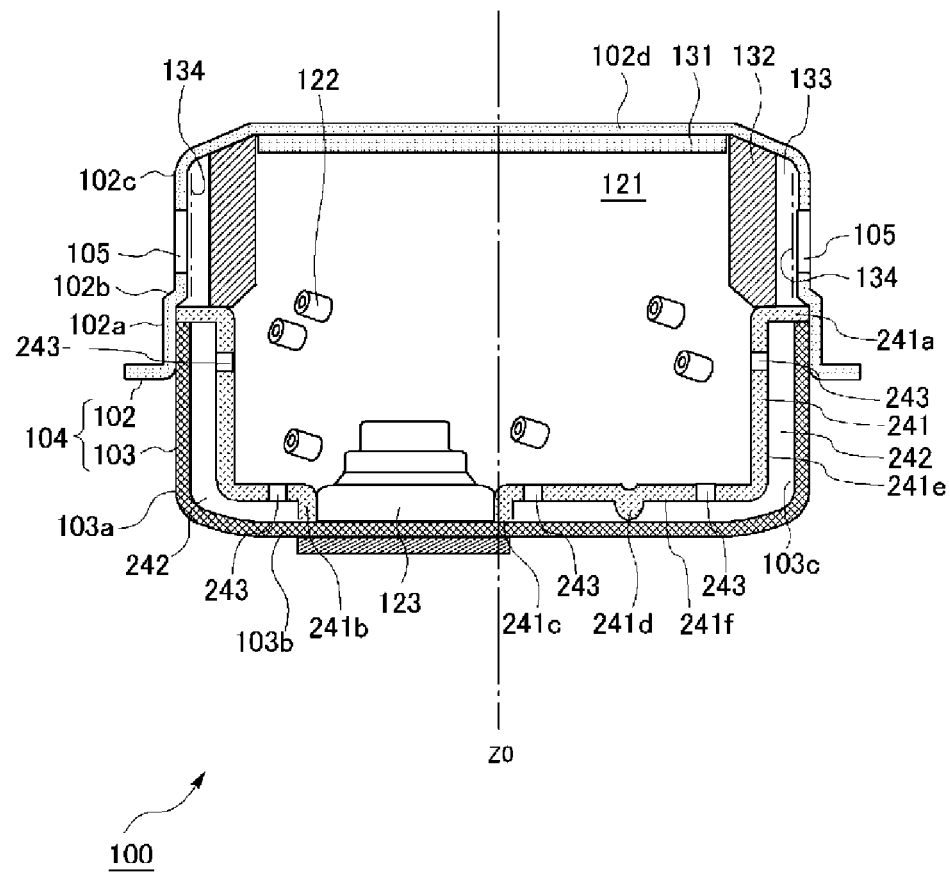
FIG. 9 is a schematic representation of a configuration of the gas generator to which a cup-shaped isolating member according to a modified example of Example 2 of the present invention is applied.

Next, a modified example of example 2 described above will be described on the basis of FIG. 9 to FIG. 11. Note that, in the present modified example, detailed descriptions of components substantially the same as those of example 1 and example 2 described above are omitted. FIG. 9 is a cross-sectional view, in a height direction, of the gas generator 100 to which a cup-shaped isolating member 241 described below has been applied in place of the O-shaped isolating member 141 illustrated in FIG. 7 described above.

Figure 10:
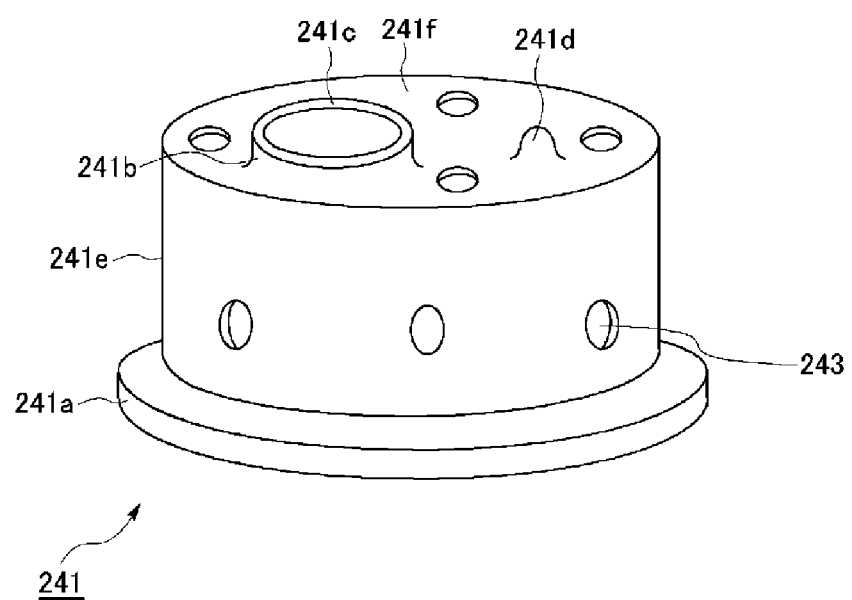
FIG. 10 is a schematic representation of a configuration of the cup-shaped isolating member according to the modified example of Example 2 of the present invention.
Figure 11:
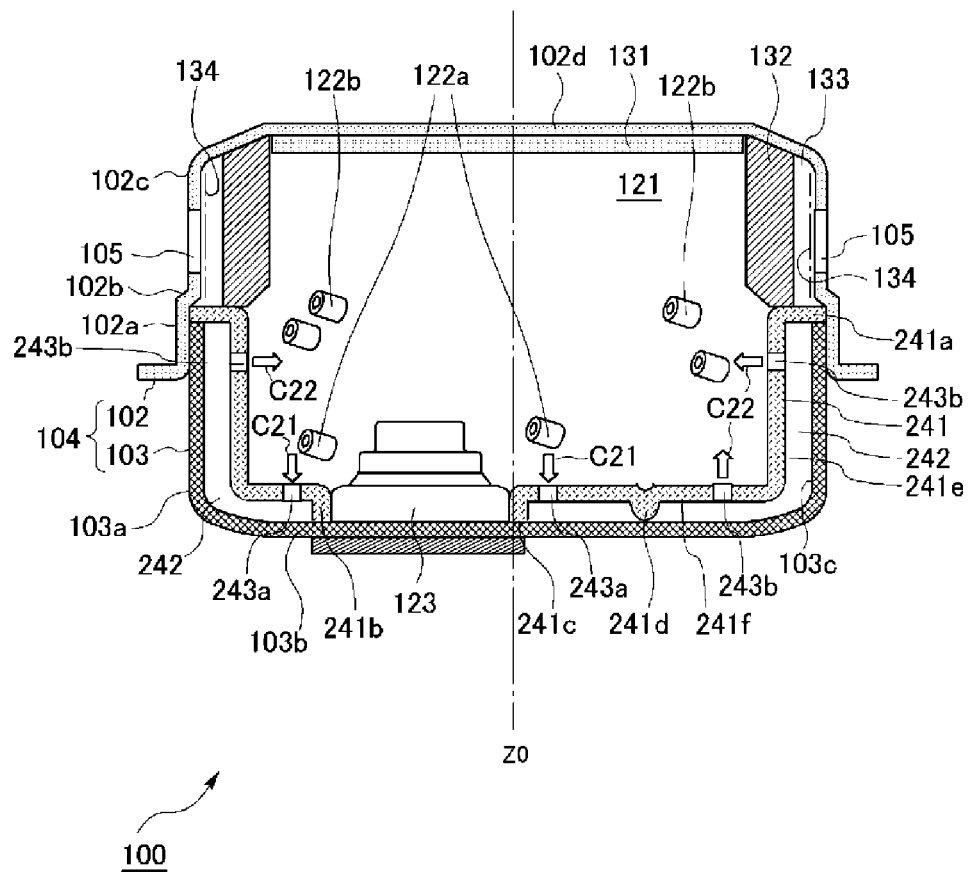
FIG. 11 is a diagram illustrating a state where a combustion product generated by combustion of the gas generating agent moves between the combustion chamber and the gas flow space in the gas generator illustrated in FIG. 9.

As illustrated in FIG. 9, this cup-shaped isolating member 241 surrounds the cluster of the second gas generating agent 122, thereby forming a gas flow space 242 between the cup-shaped isolating member 241 and the inner wall surface 103c of the lower shell 103. Specifically, the cup-shaped isolating part 241 includes a collar 241a, an igniter insertion part 241b, a bottom end 241c, a protrusion 241d, a peripheral wall 241e, and a bottom surface 241f, as illustrated in FIG. 10. Further, the cup-shaped isolating member 241 is disposed in the recessed internal space formed by the lower shell 103, abutting the collar 241a and the lower end 241c against the inner wall surface 103c of the lower shell 103, and thereby forming the gas flow space 242. Here, in a state where the cup-shaped isolating member 241 is disposed in the combustion chamber 121, a state in which the igniter 123 is inserted into the igniter insertion part 241b, which is an area including an opening provided in the bottom surface 241f of the cup-shaped isolating member 241, is formed, and thus the gas flow space 242 is formed from the peripheral wall 103a to the bottom surface 103b of the lower shell 103. Further, the projection 241d is provided on the bottom surface 241f to favorably form the gas flow space 242 (in particular, the space between the bottom surface 241f of the cup-shaped isolating member 241 and the bottom face 103b of the lower shell 103) with the lower end 241c of the cup-shaped isolating member 241.

Further, similar to the O-shaped isolating member 141 illustrated in FIG. 7 described above, a plurality of communicating holes 243 are formed in the cup-shaped isolating member 241. The plurality of communicating holes 243 are formed in the peripheral wall 241e and the bottom surface 241f of the cup-shaped isolating member 241. Then, as illustrated by the arrows C21 and C22 in FIG. 11, a portion of the combustion product generated by combustion of the gas generating agent 122a disposed proximal to the igniter 123 is flowed into the gas flow space 242 by a portion (hereinafter referred to as "inflow holes 243a") of the plurality of communicating holes 243, and the combustion product flowing through the gas flow space 242 is flowed out toward the gas generating agent 122b disposed distal to the igniter 123 by the other communicating holes (hereinafter referred to as "outflow holes 243b") of the plurality of communicating holes 243. In the cup-shaped isolating member 241 illustrated in FIG. 11, the communicating holes provided in the bottom surface 241f near the igniter insertion portion 241b are the inflow holes 243a, and the other communicating holes are the outflow holes 243b. Further, with the gas generator 100 to which such a cup-shaped isolating member 241 has been applied as well, a portion of the combustion product generated proximal to the igniter 123 can reach the gas generator 122b disposed distal to the igniter 123 as rapidly as possible. As a result, the gas generating agent 122b disposed distal to the second igniter 123 is also burned in a relatively short period of time. Note that the outflow holes 234b may be formed with openings increasing in size as the distal position from the second igniter 123 increases in distance.

REFERENCE SIGNS LIST

1 Gas generator
2 Upper shell
3 Lower shell
4 Housing
5 Gas discharge port
10 Dividing wall
14 Dividing wall part 16 Accommodating wall member
21 First combustion chamber
22 First gas generating agent
23 First igniter
25 Second combustion chamber
26 Second gas generating agent
27 Second igniter
41 O-shaped isolating member
42 Gas flow space
43 Plurality of communicating holes
43a Inflow hole
43b Outflow hole

What is claimed is:

1. A gas generator, comprising:
a housing including a top surface, a bottom surface, and a peripheral wall, and accommodating an igniter, the housing being provided with a gas discharge port, and including a combustion chamber configured to burn a gas generating agent;
the igniter provided within the housing so as to be shifted from a center of a cluster of the gas generating agent;
an isolating part that surrounds at least a portion of the cluster of the gas generating agent, and forms, between the isolating part and a predetermined area in a side of the peripheral wall where the gas discharge port is not formed, a gas flow space serving as a space in the housing where the gas generation agent is not filled, the gas flow space being at least partially cylindrical in shape in a cross section orthogonal with respect to a central axis of the gas generator; and
a plurality of communicating parts that are provided in the isolating part and connect the combustion chamber and the gas flow space,
a portion of the plurality of communicating parts being configured to allow a combustion product generated by combustion of the gas generating agent disposed proximal to the igniter to flow into the gas flow space, and another portion of the plurality of communicating parts being configured to allow a combustion product flowing through the gas flow space to flow out toward the gas generating agent disposed distal to the igniter,
wherein the gas flow space is in communication only with the combustion chamber, such that the combustion product flowing into the gas flow space from the combustion chamber flows out from the gas flow space only into the combustion chamber.

2. The gas generator according to claim 1, wherein the housing is formed by joining at least two members, two of the at least two members being integrated by welding at a predetermined welded part, and the predetermined welded part being separated from the combustion chamber by the gas flow space.

3. The gas generator according to claim 1, wherein the another portion of the plurality of communicating parts are formed with opening areas increasing in size as a distal position from the igniter increases in distance.

4. The gas generator according to claim 3, wherein the housing is formed by joining at least two members, two of the at least two members being integrated by welding at a predetermined welded part, and the predetermined welded part being separated from the combustion chamber by the gas flow space.

5. The gas generator according to claim 3, further comprising:
a dividing wall that vertically divides the combustion chamber and forms a first combustion chamber positioned on an upper side of the dividing wall and the combustion chamber positioned on a lower side of the dividing wall in an interior of the housing; and
a first igniter that burns a first gas generating agent filled in the first combustion chamber, and the igniter that burns the gas generating agent filled in the combustion chamber, disposed on a bottom surface of the housing,
the gas discharge port being formed in the housing on the first combustion chamber side, the dividing wall including an accommodating wall surrounding the first igniter disposed on the bottom surface and accommodating the first igniter inside the first combustion chamber,
the isolating part being disposed in the combustion chamber and surrounding at least a portion of a cluster of the gas generating agent, forming the gas flow space between the isolating part and an inner wall surface of the housing on the combustion chamber side such that the gas flow space is separated from the gas discharge port, and
the portion of the plurality of communicating parts being configured to allow a combustion product generated by combustion of the gas generating agent disposed proximal to the igniter to flow into the gas flow space, and the another portion of the plurality of communicating parts being configured to allow a combustion product flowing through the gas flow space to flow out toward the gas generating agent disposed distal to the igniter.

6. The gas generator according to claim 1, further comprising:
a dividing wall that vertically divides the combustion chamber and forms a first combustion chamber positioned on an upper side thereof and the combustion chamber positioned on a lower side thereof in an interior of the housing; and
a first igniter that burns a first gas generating agent filled in the first combustion chamber, and the igniter that burns the gas generating agent filled in the combustion chamber, disposed on a bottom surface of the housing,
the gas discharge port being formed in the housing on the first combustion chamber side,
the dividing wall including an accommodating wall surrounding the first igniter disposed on the bottom surface and accommodating the first igniter inside the first combustion chamber,
the isolating part being disposed in the combustion chamber and surrounding at least a portion of a cluster of the gas generating agent, forming the gas flow space between the isolating part and an inner wall surface of the housing on the combustion chamber side, and
the portion of the plurality of communicating parts being configured to allow a combustion product generated by combustion of the gas generating agent disposed proximal to the igniter to flow into the gas flow space, and the another portion of the plurality of communicating parts being configured to allow a combustion product flowing through the gas flow space to flow out toward the gas generating agent disposed distal to the igniter.

7. The gas generator according to claim 6, wherein the another portion of the plurality of communicating parts are formed with opening areas increasing in size as a distal position from the igniter increases in distance.

8. The gas generator according to claim 6, wherein the gas generating agent has a faster combustion rate than that of the first gas generating agent.

9. The gas generator according to claim 8, wherein
the another portion of the plurality of communicating parts are formed with opening areas increasing in size as a distal position from the igniter increases in distance.

10. A gas generator, comprising:
a housing including an upper shell that is provided with a gas discharge port, and a lower shell;
a combustion chamber filled with a gas generating agent;
an igniter disposed within the combustion chamber and shifted from a center of a cluster of the gas generating agent;
an isolating member provided in the lower shell so as to surround at least a portion of the cluster of the gas generating agent, the isolating member defining a gas flow space with respect to an inner wall surface of the lower shell; and
a plurality of communicating holes provided in the isolating member and connecting the combustion chamber and the gas flow space,
wherein the gas flow space is in communication only with the combustion chamber, such that a combustion product generated by combustion of the gas generating agent and flowing into the gas flow space from the combustion chamber flows out from the gas flow space only into the combustion chamber.

11. The gas generator according to claim 10, wherein
the plurality of communicating holes includes inflow holes provided proximal to the igniter and outflow holes distal to the igniter and the outflow holes are formed with opening areas increasing in size as a distal position from the igniter increases in distance.

12. The gas generator according to claim 10, wherein
the housing is formed by joining the upper shell and the lower shell integrated by welding at a predetermined welded part, and the predetermined welded part is separated from the combustion chamber by the gas flow space.

13. The gas generator according to claim 10, wherein
the isolating member has a C-shaped configuration.

14. The gas generator according to claim 10, wherein
the isolating member has an O-shaped configuration.

15. The gas generator according to claim 10, further comprising:
a dividing wall that vertically divides the combustion chamber and forms a first combustion chamber positioned in a side of the upper shell and the combustion chamber positioned in a side of the lower shell, the dividing wall including an accommodating wall provided on a bottom surface of the lower shell;
a first igniter that burns a first gas generating agent filled in the first combustion chamber, the first igniter provided on the bottom surface of the lower shell and being surrounded by the accommodating wall,
wherein the isolating member is disposed in the combustion chamber and surrounds at least a portion of a cluster of the gas generating agent disposed in the combustion chamber, the isolating member forms the gas flow space between the isolating member and an inner wall surface of the lower shell, and
the igniter that burns the gas generating agent is provided within the combustion chamber.

16. The gas generator according to claim 15, wherein
the gas generating agent has a faster combustion rate than that of the first gas generating agent.

17. The gas generator according to claim 15, wherein
the isolating member has a cup-shaped configuration and the gas flow space is formed between a bottom surface of the isolating member and a bottom face of the lower shell.

* * * * *